(12) United States Patent
Yang et al.

(10) Patent No.: US 9,235,992 B2
(45) Date of Patent: Jan. 12, 2016

(54) SIMULATOR FOR CPR AND DEFIBRILLATOR TRAINING

(75) Inventors: Seung-Jin Yang, Goyang-si (KR);
Dae-Yong Kim, Goyang-si (KR);
Nam-Hyuk Kim, Goyang-si (KR);
Seung-Hun Jeong, Goyang-si (KR);
Byeong-Jin Kim, Wonju-si (KR);
In-Bae Chang, Seoul (KR)

(73) Assignee: BT Inc., Wonju-si (KR)

( * ) Notice: Subject to any disclaimer, the term of this patent is extended or adjusted under 35 U.S.C. 154(b) by 248 days.

(21) Appl. No.: 13/493,225

(22) Filed: Jun. 11, 2012

(65) Prior Publication Data

US 2013/0330698 A1    Dec. 12, 2013

(51) Int. Cl.
*G09B 23/28* (2006.01)

(52) U.S. Cl.
CPC ................... *G09B 23/288* (2013.01)

(58) Field of Classification Search
CPC .................................................. G09B 23/288
USPC ................................................ 434/265, 267
See application file for complete search history.

(56) References Cited

U.S. PATENT DOCUMENTS

| | | | | |
|---|---|---|---|---|
| 4,932,879 A * | 6/1990 | Ingenito | ................ | G09B 23/288 273/454 |
| 5,330,514 A * | 7/1994 | Egelandsdal et al. | ......... | 434/265 |
| 6,306,107 B1 * | 10/2001 | Myklebust | ........... | A61B 5/1036 128/897 |
| 6,872,080 B2 * | 3/2005 | Pastrick et al. | ................ | 434/262 |
| 6,969,259 B2 * | 11/2005 | Pastrick | ............... | G09B 23/288 434/262 |
| 8,369,945 B2 * | 2/2013 | Youker | ................ | A61N 1/3708 607/29 |
| 8,465,293 B2 * | 6/2013 | Pastrick et al. | ................ | 434/265 |
| 2001/0012609 A1 * | 8/2001 | Pastrick | ............... | G09B 23/288 434/265 |
| 2004/0058305 A1 * | 3/2004 | Lurie et al. | ..................... | 434/265 |
| 2008/0131855 A1 * | 6/2008 | Eggert | ................... | G09B 23/30 434/266 |
| 2010/0021876 A1 * | 1/2010 | Clash | .................... | G09B 23/288 434/265 |

\* cited by examiner

*Primary Examiner* — Robert J Utama
*Assistant Examiner* — Elroy S Crocker
(74) *Attorney, Agent, or Firm* — NSIP Law

(57) ABSTRACT

There is provided a simulator for CPR and defibrillator training, which may perform training and evaluation of CPR and a defibrillator so that when there is a patient in an emergency situation, effective first aid can be provided to the patient. Through the simulator for CPR and defibrillator training, CPR and the use of the defibrillator for emergency medical technicians such as a doctor, a nurse and an emergency medical technician can be systematically and repetitively trained, and a person in charge of training can identify whether or not the education is performed effectively by recording and evaluating a training situation. Also, through the simulator, the education of CPR and defibrillator training is possible so that not only the emergency medical technicians but also general people can perform emergency treatment effectively.

1 Claim, 12 Drawing Sheets

SIMULATOR FOR CPR AND DEFIBRILLATOR TRAINING

BACKGROUND

1. Field

The following description relates to a simulator for CPR and defibrillator training, and more particularly, to a simulator including a human body model having various types of actuators and sensors, a simulator control device and a monitoring device having a built-in training procedure program so that a general person, an unskilled person, and emergency medical technicians such as a doctor, a nurse and an emergency medical technician can perform CPR and defibrillator training in the same manner in which CPR and a defibrillator are used on an actual human body.

2. Description of the Related Art

Cardiopulmonary resuscitation (CPR) is an emergency treatment of assisting a person suffering from a heart attack with blood circulation and breathing. A defibrillator is a medical device that generates and delivers an electric shock to revive a person's heart, and may be classified as a manual defibrillator used by emergency medical technicians or an automated external defibrillator (AED) used by general people. CPR and the use of the defibrillator allow a person's blood to be circulated during a heart attack, so that it is possible to delay brain damage and to resuscitate the person from the heart attack. Statistics show that if an acute heart attack patient receives CPR within four minutes, the resuscitation rate can be increased to 50% or higher. As such, it is important to use CPR and the defibrillator as soon as a heart attack patient is discovered, and this necessity has been increasingly recognized.

CPR is performed through basic steps including a consciousness identification step of identifying a patient's state, a help and report step of immediately asking neighbors for help in a loud voice and dialing an emergency number when it is identified that the patient is unconscious, an airway security step of pulling back the patient's head and lifting the patient's chin so as to prevent the patient's airway from being blocked due to tongue muscle relaxation, a pulse identification step of identifying the pulse of the carotid artery, a breast pressure step of applying pressure to the heart of the patient whose heart has stopped, a respiration identification step of observing whether or not the patient's breast goes up and down while identifying the patient's respiration so as to start artificial respiration, an artificial respiration step of inspiring air into the patient's lungs in which the respiration has stopped, and a repetition step of repeatedly providing the breast pressure and artificial respiration to the patient until emergency medical technicians arrive on the spot.

In addition to CPR, the use of the defibrillator, which restores an irregular electrocardiogram signal of a patient's heart to a normal electrocardiogram signal through electric shock treatment, has recently increased. The defibrillator is a medical device that generates and delivers an electric shock to revive a person's heart. The defibrillator determines whether the waveform state of the patient's heart is normal or abnormal and forcibly applies an electric shock to the patient's heart based on the determined result, thereby restoring the abnormal waveform of the patient's heart to the normal waveform. Because a bill for installing the defibrillator in many facilities, etc. has recently been approved, the installation of AEDs easily available for general people is tending to increase, and the AED instructs people on its usage in voice so that anyone can easily use the AED.

According to the related art, there are many products in which CPR training and evaluation are possible but the training and evaluation using the defibrillator are impossible. The products have configurations that do not satisfy main functions of CPR.

In a related art simulator, the function of a pupil reaction test does not exist, or a pupil is manually replaced for each case. The function of pulse generation does not exist either, or a manual pulse generation method of pumping with a hand is used.

Since the related art simulator is configured in such a manner that if the breast of the related art simulator is pressed, one compression spring moves up and down, the related simulator is different from an actual human body. The breast pressure is possible only when pressure is applied vertically to the breast of the related art simulator. However, the breast pressure is possible when pressure is applied vertically or diagonally to the breast of an actual human body. The related art simulator is manufactured in such a manner that the position of the breast pressure is identified with the naked eye or a button switch. However, if the position of the breast pressure is identified with the naked eye, a trainer has difficulty in deciding the exact position of the breast pressure, and may subjectively decide the position of the breast pressure. If the position of the breast pressure is identified with the button switch, the measurement of the breast pressure is possible only at the position of the button switch, and therefore, the decision of accuracy may be inaccurate. The depth of the breast pressure is identified using a photointerrupter method or using a method in which the breast pressure is mechanically stuck when the breast pressure reaches a certain depth. However, when identifying an appropriate depth of the breast pressure recommended in the guidelines of the International CPR Institute or Korean Association of CPR, the mechanical method can measure only the certain depth of the breast pressure. Therefore, when the breast pressure is weak or strong, the decision of the depth of the breast pressure is impossible. The photointerrupter method is a method of detecting a position by passing or blocking light transmitted through holes formed at a certain interval in a plate. In the photointerrupter method, the unit of height becomes an interval between the holes. However, since it is difficult to implement a hole interval of a few millimeters (mm), the measurement accuracy is low, and there is a limitation in improving the measurement accuracy.

In the related art simulator, the detection of a flow rate of air in training for artificial respiration is performed by identifying, with the naked eye, that if air is injected into the related art simulator, a lung-shaped bag expands and the height of the lung-shaped bag increases or by measuring a change in height using a photointerrupter in the same manner as the breast pressure. However, as described above, a trainer has difficulty in detecting an exact flow rate of air, and may subjectively decide the flow rate of air. Therefore, it is difficult to perform training for the flow rate of air in the artificial respiration recommended in the guidelines of the International CPR Institute or Korean Association of CPR.

In the related art simulator, an input/output display device displays a training course in such a manner that LEDs are simply turned on/off. Since there exists no scenario program for training or the reaction of the related art simulator is manually reproduced when the scenario program is executed, the reality of the related art simulator is deficient.

SUMMARY

The following description relates to a simulator for CPR and defibrillator training, which may perform training and evaluation of CPR and use of a defibrillator so that when there is a patient in an emergency situation, effective first aid can be provided to the patient.

According to an exemplary aspect, there is provided a simulator for cardiopulmonary resuscitation (CPR) and defibrillator training, including a human body model formed in a similar shape to the external shape of an actual human body, an impact sensor sensing an impact applied to the human body model by the user in a process of identifying consciousness of the human body model, an airway security module installed at a neck part of the human body model so as to sense whether or not the airway of the human body model is secured, a pulse generation module installed at the neck part of the human body model so as to generate carotid artery pulses that the user can sense and to determine whether the user is sensing the pulses by sensing pressure generated by a user's external force, a pupil reflection module installed at a head part of the human body model so as to automatically implement a pupil reaction function by sensing that external light is incident, an artificial respiration module measuring when the user provides artificial respiration to oral and nasal cavity parts of the human body model and the flow rate and speed of air flowing into the human body model, and allowing the user to identify that the human body model is in a revival state through voluntary breathing of the human body model when the user properly provides CPR to the human body model according to a predetermined procedure, a breast pressure module installed in a torso part of the human body model so as to sense the position, depth, speed and frequency of breast pressure performed in various directions by the user, and a defibrillator training module outputting an electrocardiogram signal similar to that generated in an actual human body, protecting electronic circuits in the human body model from an electrical impact generated from a defibrillator device used in a defibrillator training process, and sensing the number of electrical impacts generated from the defibrillator device:

Other objects, features and advantages will be apparent from the following description, the drawings, and the claims.

BRIEF DESCRIPTION OF THE DRAWINGS

FIGS. 4A and 4B are views illustrating a state in which a torso part of a human body model is pressed by a user, in which FIG. 4A is a sectional view taken along line A-A' in the breast pressure module shown in FIG. 3, and FIG. 4B is a sectional view taken along line B-B' in the breast pressure module shown in FIG. 3.

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. Also, descriptions of well-known functions and constructions are omitted to increase clarity and conciseness.

Figure 1:
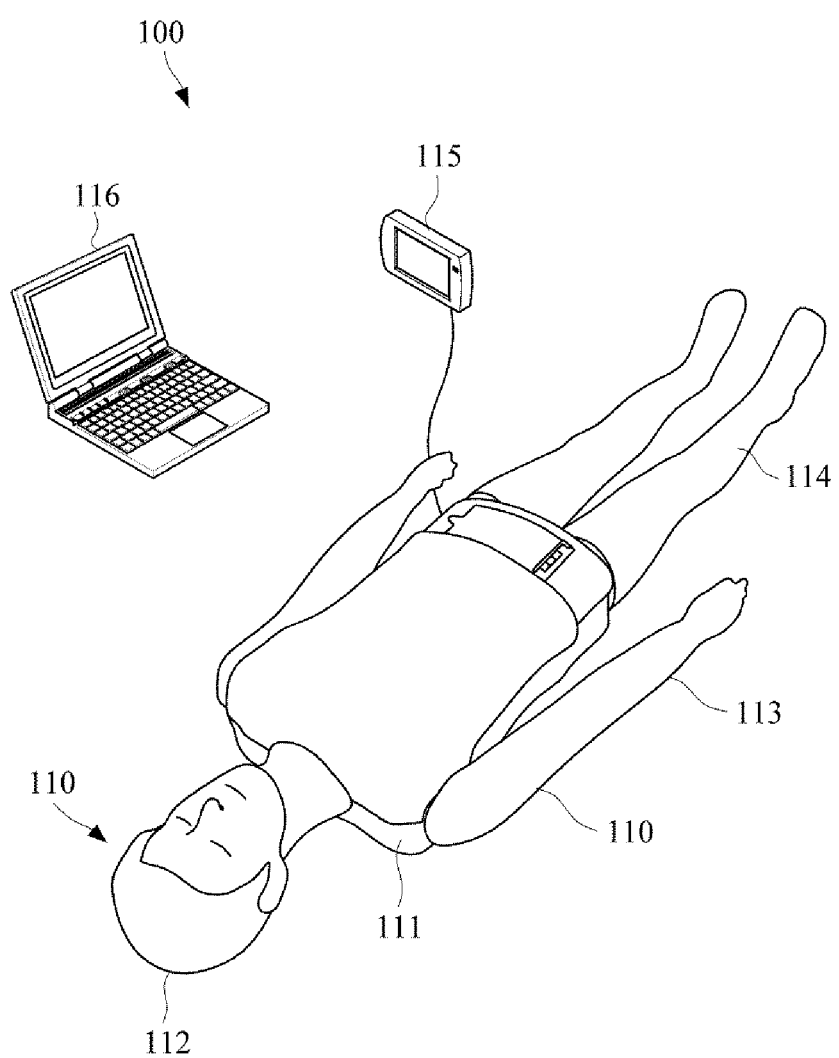
FIGS. 1 and 2 are views schematically illustrating a simulator for CPR and defibrillator training according to an exemplary embodiment of the present invention.
Figure 2:
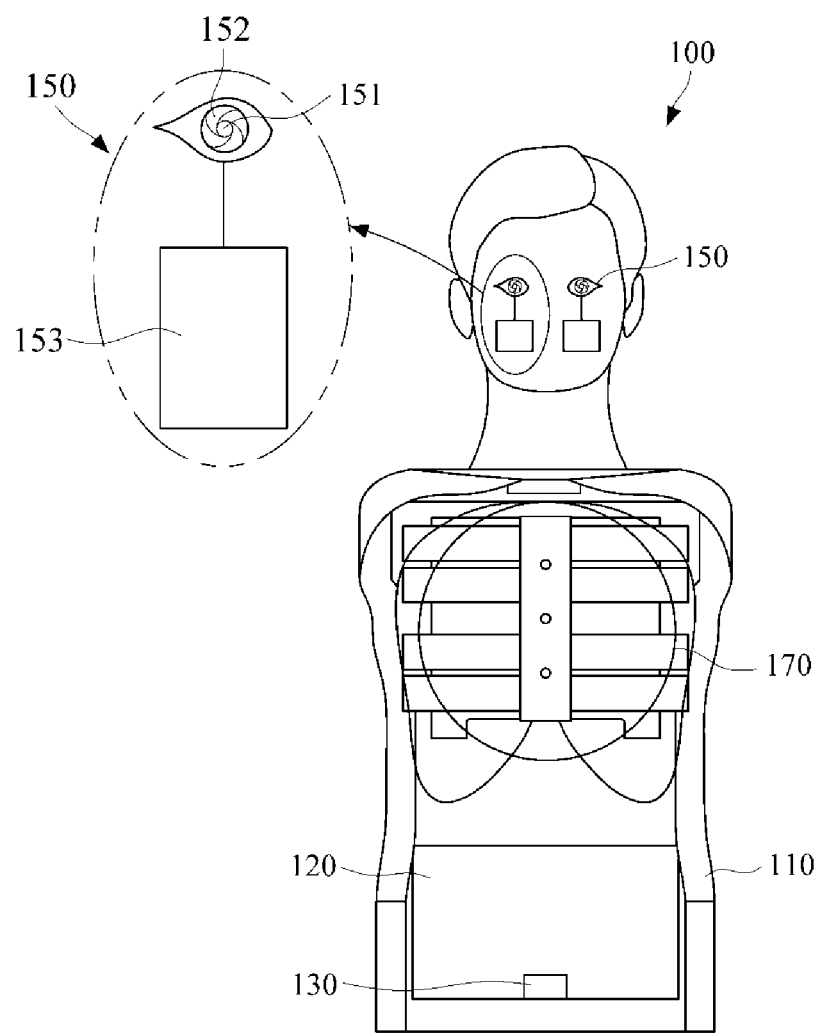

Referring to FIGS. 1 and 2, a simulator 100 for CPR and defibrillator training according to an exemplary embodiment of the present invention includes a human body model 110, an impact sensor 130, an airway security module 140, a pulse generation module 180, a pupil reflection module 150, an artificial respiration module 160, a breast pressure module 170 and a defibrillator training module 190.

The human body model 110 is formed in a shape similar to the external appearance of an actual human body. The human body model 110 has an external appearance according to the standard human body, and may be covered with skin made of a silicone or urethane material. The human body model 110 may be composed of a torso part 111, a head part 112, an arm part 113 and a leg part 114. The arm part 113 of the human body model 110 may be implemented to perform blood pressure/pulse measurement training and injection training of medicinal water/watery liquid, etc. The arm part 113 of the human body model 110 may be replaced with a model for trauma treatment. The leg part 114 of the human body model 110 may also be replaced with a model on which training for trauma treatment can be performed. Each joint part of the human body model 110 may be designed to reproduce the degree of freedom of human body joints.

The impact sensor 130 senses an impact applied to the human body model 110 by a user in a process of identifying the consciousness of the human body model 110. That is, when the user applies an impact to the human body 110 so as to identify the consciousness of the human body model 110 that is a virtual patient, the impact sensor 130 senses the impact and enables the user to confirm that the user has performed the process of identifying the consciousness of the human body model 110.

The airway security module 140 is installed at a neck part of the human body model 110 to block and open an airway for artificial respiration. The neck part of the human body model 110 is a part that connects the head part 112 and the torso part 111. The detailed structure of the airway security module will be described later.

The pulse generation module 180 is installed at the neck part of the human body model 110 so as to generate carotid artery pulses sensible to the user. The pulse generation module senses the pressure caused by a user's external force and enables the user to determine the presence of a pulsing sensation.

The pupil reflection module 150 is installed at the head part 112 of the human body model 110 so as to automatically implement a pupil reaction function by sensing that external light is incident. The user identifies the state of a patient by examining the patient's pupils, which change when the user shines light on a patient's eye. The pupil reflection module 150 is used to implement such a function.

The artificial respiration module 160 measures the flow rate and speed of air flowing into the human body model 110 when artificial respiration is performed on the human body model 110 through an oral cavity part or nasal cavity part. In an actual CPR process, the user provides the artificial respiration to a patient. The artificial respiration module 160 implements such an artificial respiration function and enables the user to confirm that the artificial respiration has been performed effectively by lifting the breast of the human body model 110 as air is inspired into the human body model 110 in the same manner as breathing of an actual human body. When the user properly provides CPR to the human body model 110 according to the predetermined procedure, the voluntary breathing of the human body model 110 is started by an air pumping unit 164, so that the user can identify that the human body model 110 is in a revival state. To this end, an example of the structure of the artificial respiration module will be described later.

The breast pressure module 170 is installed in the torso part 111 of the human body model 110 so as to sense the position, depth, speed and frequency of breast pressure performed in various directions by the user.

The defibrillator training module 190 outputs an electrocardiogram signal similar to that generated from an actual human body, and senses the number of electrical impacts generated from a defibrillator while protecting electronic circuits in the human body model 110 from the electrical impacts generated from the defibrillator.

Meanwhile, the simulator 100 according to the exemplary embodiment of the present invention may include an input/output monitoring device and a scenario program.

The input/output monitoring device 115 and 116 may include a touch panel monitor 115, a PC/notebook computer 116, etc. The input/output monitoring device may set a state of the simulator and perform bidirectional self learning by monitoring a training procedure. The input/output monitoring device may store evaluation results and output the results through an external printer.

Patients in several cases of single CPR, double CPR, only artificial respiration, only breast pressure, defibrillator used once, defibrillator used twice, etc. may be expressed through the scenario program. When the CPR and defibrillator training is properly performed, functions of pupil reflection, pulse beating, voluntary breathing, and normal electrocardiogram signal generation are implemented.

Meanwhile, the simulator 100 according to the exemplary embodiment of the present invention may further include a main control module 120. The main control module 120 is installed in the human body model 110 so as to receive information of various sensors, input by a microprocessor control device, and to output an actuator driving signal. The main control module 120 enables the user to adjust a pressure speed in breast pressure by generating a metronome sound for each pressure time period according to the guidelines. The main control module 120 is connected to the input/output monitoring device 115 and 116 through wired/wireless communication so as to receive setup information of the simulator or to output the training procedure, etc.

Through the simulator 100 configured as described above, emergency medical technicians such as a doctor, a nurse and an emergency medical technician can be systematically and repetitively trained in CPR and the use of the defibrillator, and a person in charge of training can identify whether or not the education is performed effectively by recording and evaluating a training situation. Through the simulator 100, the education of CPR and the use of the defibrillator is possible so that not only the emergency medical technicians but also general people can perform emergency treatment effectively.

Since the simulator 100 according to the exemplary embodiment of the present invention can be implemented to approximate that of an actual human body, the user can undergo training of consciousness identification, airway security, pulse identification, breast pressure, artificial respiration and use of a manual defibrillator or AED, which constitute the CPR procedure, without dealing with an actual human body. Thus, the degree of proficiency according to the repetitive training can be increased, and a trainee undergoing the training through the simulator can feel familiar with an actual human body.

In the related art simulator, the pupil reflection, the pulse generation and the voluntary breathing are manually implemented. However, in the simulator according to the exemplary embodiment of the present invention, when CPR and the use of the defibrillator are properly performed according to the built-in scenario program, the pupil reflection, the pulse generation, the voluntary breathing and the generation of the normal electrocardiogram signal are automatically implemented, so that the reality of training can be improved.

Figure 3:
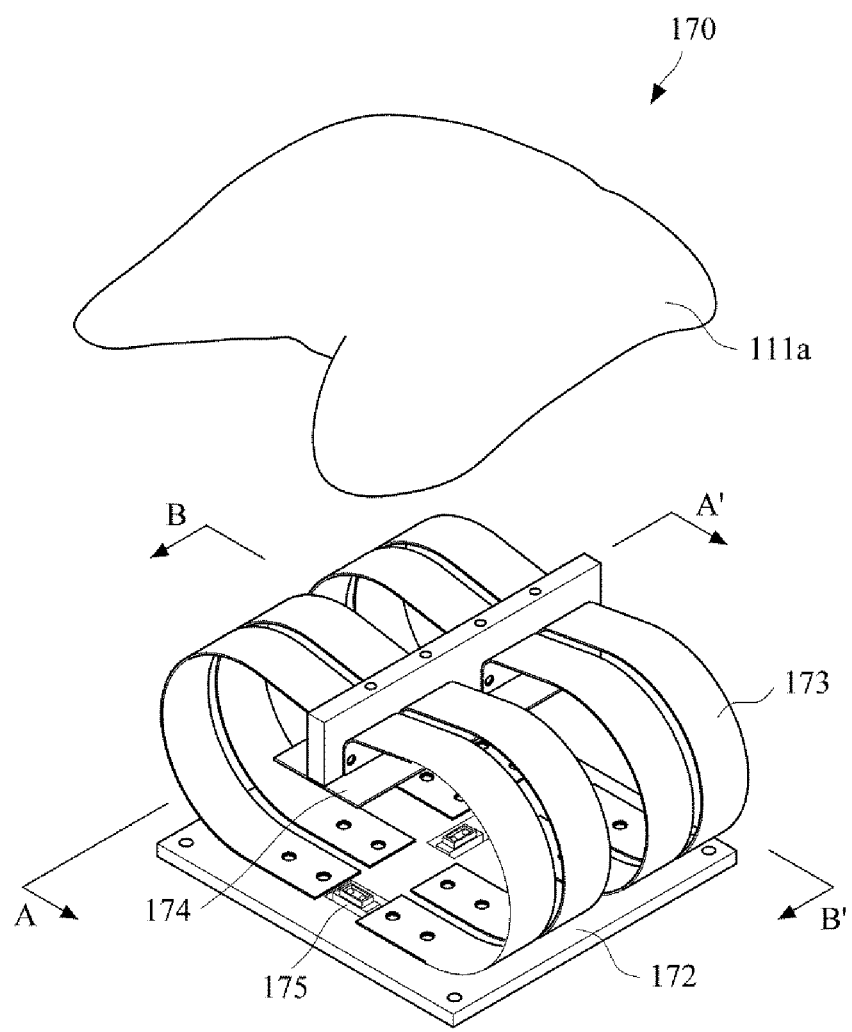
FIG. 3 is a perspective view illustrating a breast pressure module extracted from the simulator according to the exemplary embodiment of the present invention.

Meanwhile, referring to FIG. 3, the breast pressure module 170 may include a top plate part 171, a bottom plate part 172, elastic parts 173, a reflection part 174 and a distance measuring unit 175.

The top and bottom plate parts 171 and 172 are installed in the torso part 111 of the human body model 110, and are vertically spaced a predetermined distance apart so that one surfaces of the top and bottom plate parts 171 and 172 are opposite to each other. The top plate part 171 may be disposed to be adhered closely to the inner wall of the breast 111a in the torso part 111 of the human body model 110. The bottom plate part 172 may be disposed to be adhered closely to the inner wall of the back in the torso part 111 of the human body model 110.

The elastic part 173 is a bending-type elastic support structure having a similar structure to the rib of an actual human body. One end of the elastic part 173 is fixed and coupled to the top plate part 171, and the other end of the elastic part 173 is fixed and coupled to the bottom plate part 172, so that the top and bottom plate parts 171 and 172 can be elastically supported in a direction distant from each other. For example, the elastic part 173 may be a leaf spring formed to be bent in a 'U' shape. Through the elastic part 173, the top plate part 171 and the bottom plate part 172, the user can apply pressure to the torso part 111 of the human body model 110 in a direction vertical to the torso part 111 or in a direction inclined at a predetermined angle to the torso part 111. Particularly, the elastic part 173 is configured as the leaf spring formed to be bent in the 'U' shape, so that in whatever direction external forces are applied to the torso part 111 of the human body model 110, the top plate part 171 can be easily restored to the original position. Through such a structure, the user can feel as if the user is providing CPR to an actual human body.

The reflection part 174 formed in a plate shape is fixed and coupled to the top plate part 171 below the top plate part 171. In the process of providing CPR to the human body model 110, the user presses the human body model 110 with a specific force at regular intervals. In this case, the reflection part 174 is moved together with the top plate part 171 by the pressure. The reflection part 174 may be formed to have a size corresponding to that of the bottom surface of the top plate part 171. This enables the distance measuring unit 175 to more precisely measure a change of the top plate part 171.

Figure 4A:
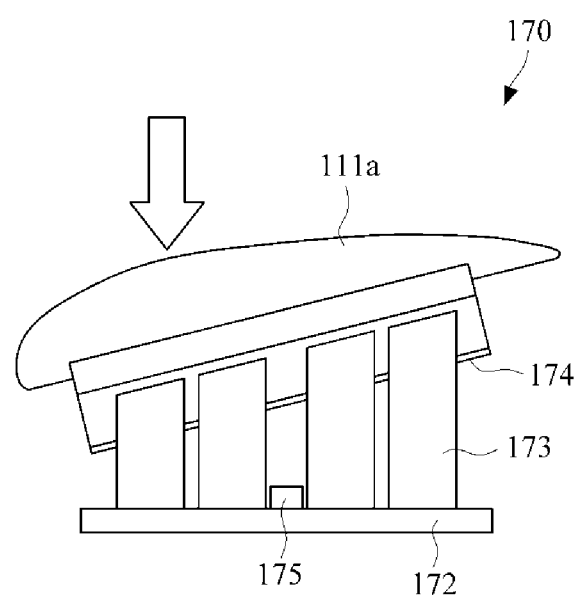
Figure 4B:
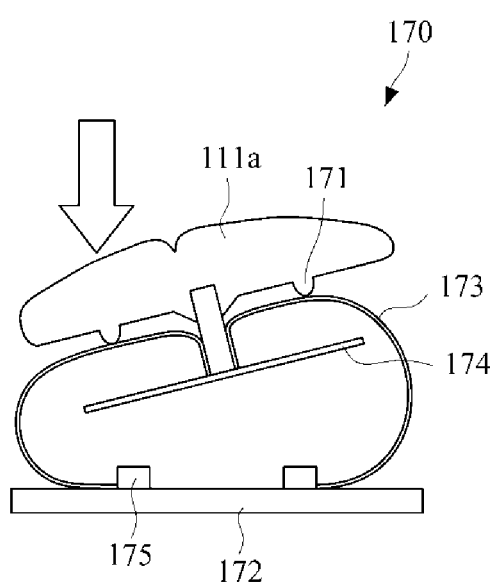

The distance measuring unit 175 is disposed to correspond to the reflection part 174 on the top surface of the bottom plate part 172 so as to measure a distance to the reflection part 174, which is changed by the user's pressure. The distance measuring unit 175 may be configured with a plurality of distance measuring sensors. As shown in FIGS. 4A and 4B, when the human body model 110 is pressed, the distance measuring sensors measure distances to the reflection part 174 and indirectly measure a movement state of the top plate part 171, thereby measuring a change in depth of the pressure. The distance measuring unit 175 estimates information on the position of the pressure according to the distance information of the distance measuring sensors, and obtains a pressure frequency, a pressure speed, etc. according to the distance information based on time.

Meanwhile, referring back to FIG. 2, the pupil reflection module 150 may include a light intensity sensing unit 151 and a pupil unit 152 and 153.

The light intensity sensing unit 151 is installed in the head part 112 of the human body model 110 so as to measure the amount of light flowing into the human body model 110 through the pupil formed in the head part 112 of the human body model 110. For example, the light intensity sensing unit 151 may be a photovoltaic cell.

The pupil unit 152 and 153 is opened or closed according to the amount of light flowing into the light intensity sensing unit 151, thereby implementing a pupil reflection function. The pupil unit 152 and 153 may include an iris 152, a motor 153 operating the iris 152, and a microprocessor controlling the motor 153.

The pupil reflection module 150 configured as described above can automatically implement the patient's pupil reflection function by opening/closing the iris 152 through the motor 153 in consideration of the programmed patient's state and the amount of light measured in the photovoltaic cell.

Figure 5:
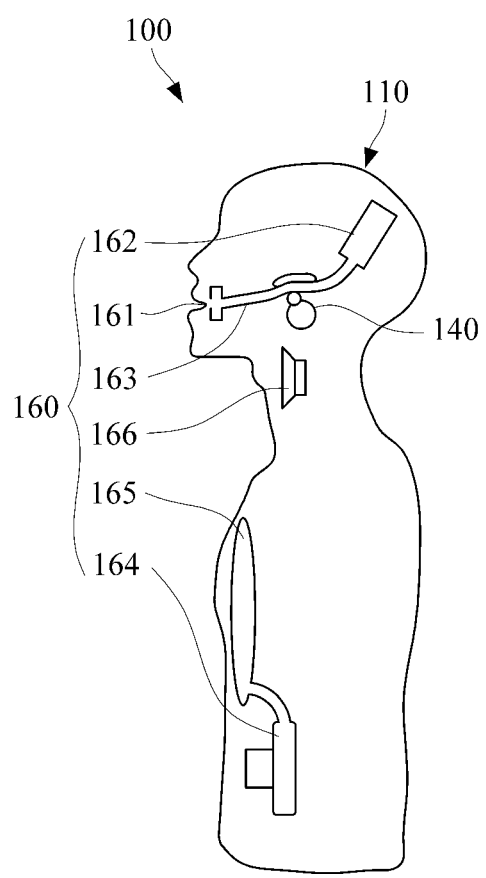
FIG. 5 is a view schematically illustrating an artificial respiration module in the simulator according to the exemplary embodiment of the present invention.

Meanwhile, referring to FIG. 5, the aforementioned example of the artificial respiration module 160 may include an air injection unit 161, a flow rate detection unit 162, an air transfer unit 163, an air storage unit 165, an air pumping unit 164 and a respiratory sound output unit 166.

The respiratory sound output unit 166 is installed in the body model 110 and outputs a similar respiratory sound to a respiratory sound of an actual human body. The respiratory sound output unit 166 can output a normal respiratory sound, an apneal sound and an agonal breathing sound of an actual human body. In the process for the user to perform CPR training, the respiratory sound output unit 166 generates a similar respiratory sound to a respiratory sound of an actual human body, thereby enabling the user to perform the CPR training as if the user were in a real situation.

The air injection unit 161 is installed at the oral cavity part in the head part 112 so that external air can be injected. The air injection unit 161 can be formed to penetrate the oral cavity part in the head part 112 corresponding to an oral cavity of an actual human body.

The flow rate detection unit 162 is installed in the head part 112 so as to measure the amount of air injected into the air injection unit 161. As the flow rate detection unit 162 is disposed in the head part 112, air flowing in through the air injection unit 161 during the process of performing the CPR training and moisture in the air are exhausted to the rear of the head part 112, and thus do not flow backward, so that infection through other's saliva can be prevented during the CPR training. The total amount of air injected by the user through the air injection unit 161 can be obtained by integrating flow rate data measured by the flow rate detection unit 162. For example, the flow rate detection unit 162 may be a flow rate sensor or a differential pressure sensor.

The air transfer unit 163 connects the air injection unit 161 with the flow rate detection unit 162. One end of the air transfer unit 163 is fixed to the air injection unit 161, and a free end is fixed to the flow rate detection unit 162 disposed in the head part 112 of the human body model 110 so as to transfer air of the user. For example, the air transfer unit 163 may be a tube.

The aforementioned airway security module 140 is installed on the air transfer unit 163 so as to control flow of fluid moving through the air transfer unit 163. When the user secures the airway of the human body model 110 during the process of performing artificial respiration training, the airway security module 140 causes the airway to be open, that is, the air transfer unit 163 to be connected. When the airway is secured for artificial respiration, the airway security module 140 switches from a closed airway state to an open airway state. The detailed structure of the airway security module 140 for this purpose will be described later.

The air storage unit 165 is installed in the torso part 111 so as to be filled with fluid. The torso part 111 can expand or contract according to the amount of fluid flowing into the air storage unit 165. The air storage unit 165 is not connected with the air injection unit 161 and the air transfer unit 163, but is independently installed in the torso part 111. The air storage unit 165 may be formed to have a similar size and shape to the lungs of an actual human body.

The air pumping unit 164 is disposed to be connected with the air storage unit 165 on the transfer unit 166. The air pumping unit 164 supplies the fluid to the air storage unit 165 or exhausts the fluid from the air storage unit 165. When the air pumping unit 164 supplies the fluid to the air storage unit 165, the air storage unit 165 expands, and the torso part 111 of the human body model 110 also expands. On the other hand, when the fluid is exhausted from the air storage unit 165 by the air pumping unit 164, the air storage unit 165 contracts, and the torso part 111 of the human body model 110 also contracts and is restored to the initial state. An example of the air pumping unit 164 for implementing this may be an air pump or blower fan.

Unlike the aforementioned structure, in a structure in which the air injection unit, the air transfer unit and the air storage unit are sequentially connected, there is a probability that air blown by another user and stored in the air storage unit will flow backward to the oral cavity of the user during the process in which the user blows air into the human body model 110. However, the CPR simulator 100 according to the exemplary embodiment of the present invention has a structure in which the air injection unit 161 through which air flows and the air storage unit 165 in which air is stored are not connected but independently disposed. Thus, saliva or air of another user does not flow into the user during the process of CPR training, and the CPR training can be sanitarily performed.

When the user breathes into the air injection unit 161 of the CPR simulator 100 according to the exemplary embodiment of the present invention, the flow rate is measured by the flow rate detection unit 162, and the air pumping unit 164 operates so as to expand and contract the torso part 111 of the human body model 110. The user identifies that artificial respiration is being performed effectively by looking at the expansion and contraction states of the torso part 111.

Figure 6A:
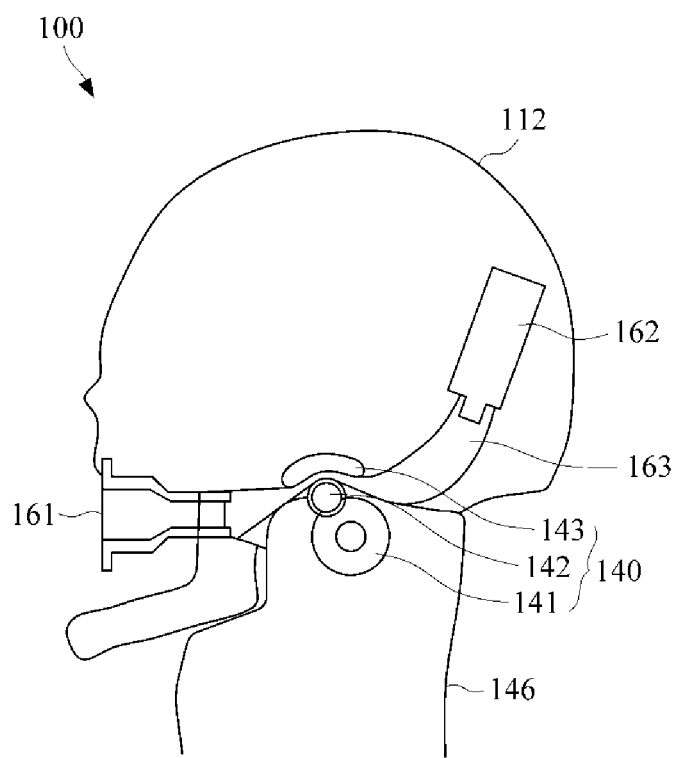
FIGS. 6A to 6B are side views illustrating an operation process of an airway security module in the simulator according to the exemplary embodiment of the present invention.
Figure 6B:
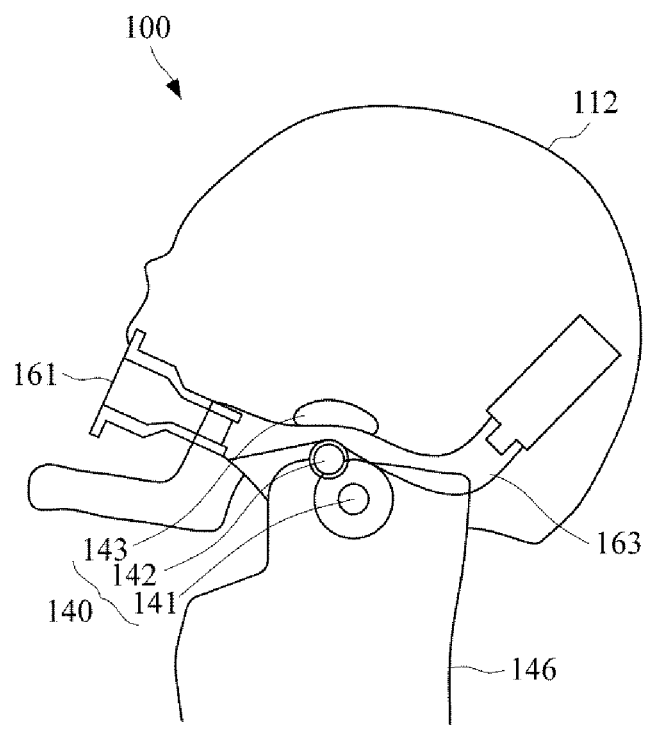

Meanwhile, referring to FIGS. 6a and 6b, the structure of the airway security module 140 may include a fixing unit 141, a first compression unit 142 and a second compression unit 143 by way of example. Here, descriptions will be made assuming that the air transfer unit 163 is formed of a tube with a specific length.

The fixing unit 141 is fixed and coupled to one side of the neck part of the torso part 111 and installed close to the air transfer unit 163.

The first compression unit 142 is fixed and coupled to the fixing unit 141 and closely adheres to the air transfer unit 163. For example, the first compression unit 142 may be a stainless pipe.

The second compression unit 143 is rotatably coupled to the fixing unit 141 and fixed and coupled to the head part 112. The second compression unit 143 seals or opens the air transfer unit 163 while rotating about the fixing unit 141 according to rotation of the head part 112. To this end, the second compression unit 143 may have an arc shape by way of example, and may be eccentrically coupled to the fixing unit 141

In general, to perform artificial respiration on an actual human body, an airway security process of opening an airway is performed first. Likewise, in artificial respiration training, a state in which the user does not pull back the head part 112 of the human body model 110 with respect to the torso part 111, the second compression unit 143 is adjacent to the first compression unit 142, a part of the air transfer unit 163 is compressed, and thus flow of fluid is prevented is an initial state. In the initial state, the user performs an airway security step of pulling back the head part 112 of the human body model 110 with respect to the torso part 111 and lifting the chin. Then, the second compression unit 143 rotates about the fixing unit 141, and the compressed part of the air transfer unit 163 is open. In this state, the user can inject air through the air injection unit 161, that is, artificial respiration is enabled.

Since the eccentric second compression unit 143 compresses the air transfer unit 163 by rolling contact without slipping according to rotation of the head part 112, reliability of airway blocking is high, and damage of the air transfer unit 163 can be minimized.

An angle measuring unit 148 measures a rotated angle of the head part 112 with respect to the torso part 111. In the process of dealing with the human body model 110, particularly in the process of airway security, the user allows the head part 112 of the human body model 110 to be inclined at a predetermined angle with the torso part 111. For example, the angle measuring unit 148 may be an angle measuring sensor. The angle measuring sensor measures a change in inclination of the head part 112 of the human body model 110. The angle measuring sensor determines whether or not the head part 112 is excessively rotated with respect to the torso part 111. For example, the angle measuring sensor may be a potentiometer, tilt sensor, acceleration sensor, etc.

When the training in CPR and the use of the defibrillator is performed according to the scenario program described above, the air pumping unit 164 performs voluntary breathing by injecting air into the air storage unit 165 at regular intervals, so that the lifting of the breast is performed similarly to breathing generated in an actual human body. Thus, the user can identify that the training has been performed effectively.

Figure 7:
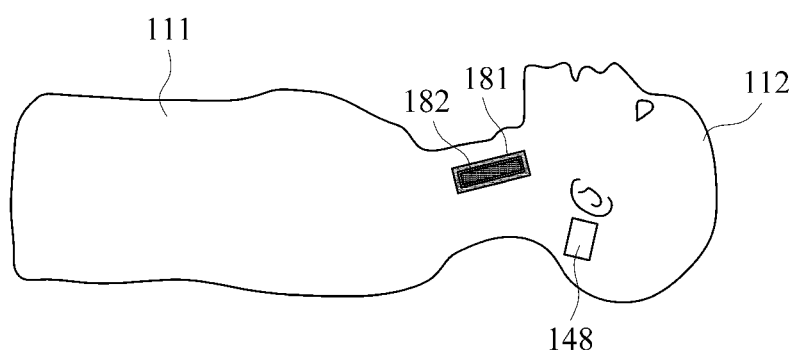
FIG. 7 is a view schematically illustrating a pulse generation module in the simulator according to the exemplary embodiment of the present invention.
Figure 8:
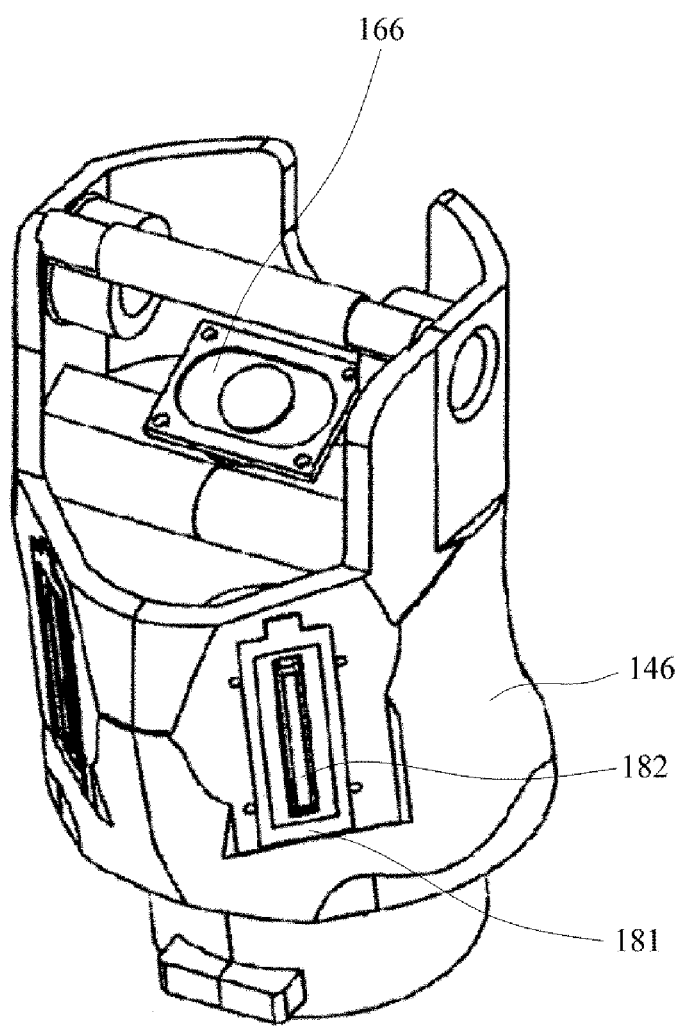
FIG. 8 is a perspective view illustrating the pulse generation module extracted from the simulator shown in FIG. 7.

Meanwhile, referring to FIGS. 7 and 8, the pulse generation module 180 may include a pulse sensing unit 181 and a pulse generation unit 182 by way of example.

The pulse sensing unit 181 is disposed at a portion of the neck of the human body model 110 so as to sense the presence of pulse sensing of the user's fingers. Preferably, the pulse sensing unit 181 may be disposed at a position at which a blood vessel of an actual human body is located. For example, the pulse sensing unit 181 may be a pressure sensor or membrane switch.

The pulse generation unit 182 is disposed at a portion of the neck of the human body model 110 so as to generate a pulse. That is, the pulse generation unit 182 generates a pulse of the carotid artery that the user can sense. As shown in FIG. 8, the pulse generation unit 182 is disposed at a portion of the outer frame of an actual human body so as to reproduce an actual pulse of the carotid artery. For example, the pulse generation unit 182 may be a speaker-type actuator.

Figure 9:
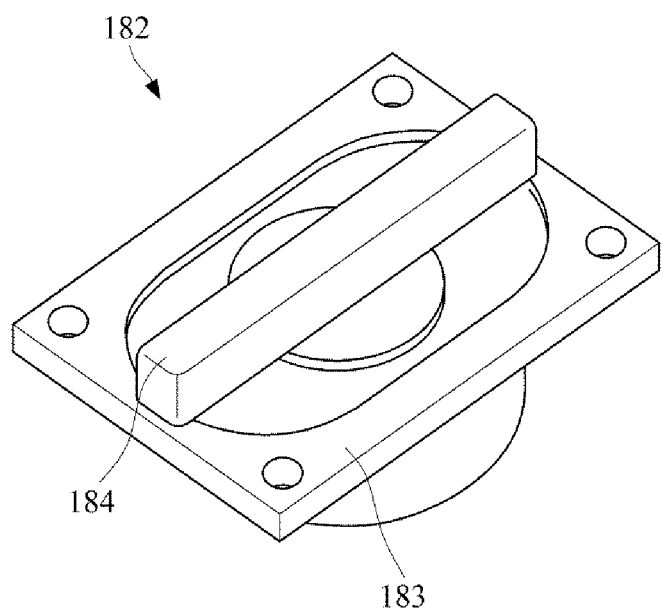
FIG. 9 is a perspective view illustrating a pulse generation unit extracted from the pulse generation module shown in FIG. 8.

Referring to FIG. 9, the speaker-type actuator may include a speaker 183 and a moving member 184. The speaker 183 is fixed and coupled to the outer neck frame 146. The moving member 184 is a copy of a blood vessel fixed and coupled to an unshown dust cap 183, of the speaker. The moving member 184 is formed to communicate through a groove formed in the outer neck frame 146.

If current is actually applied to the speaker 183 in the form of an electrocardiogram signal having a normal waveform, an unshown voice coil and the dust cap in the speaker 183 vibrate, and the moving member 184 fixed and coupled to the dust cap also vibrates. If current is applied to the speaker 183 at regular intervals, the user feels the same pulse as that of the carotid artery of an actual human body.

Figure 10:
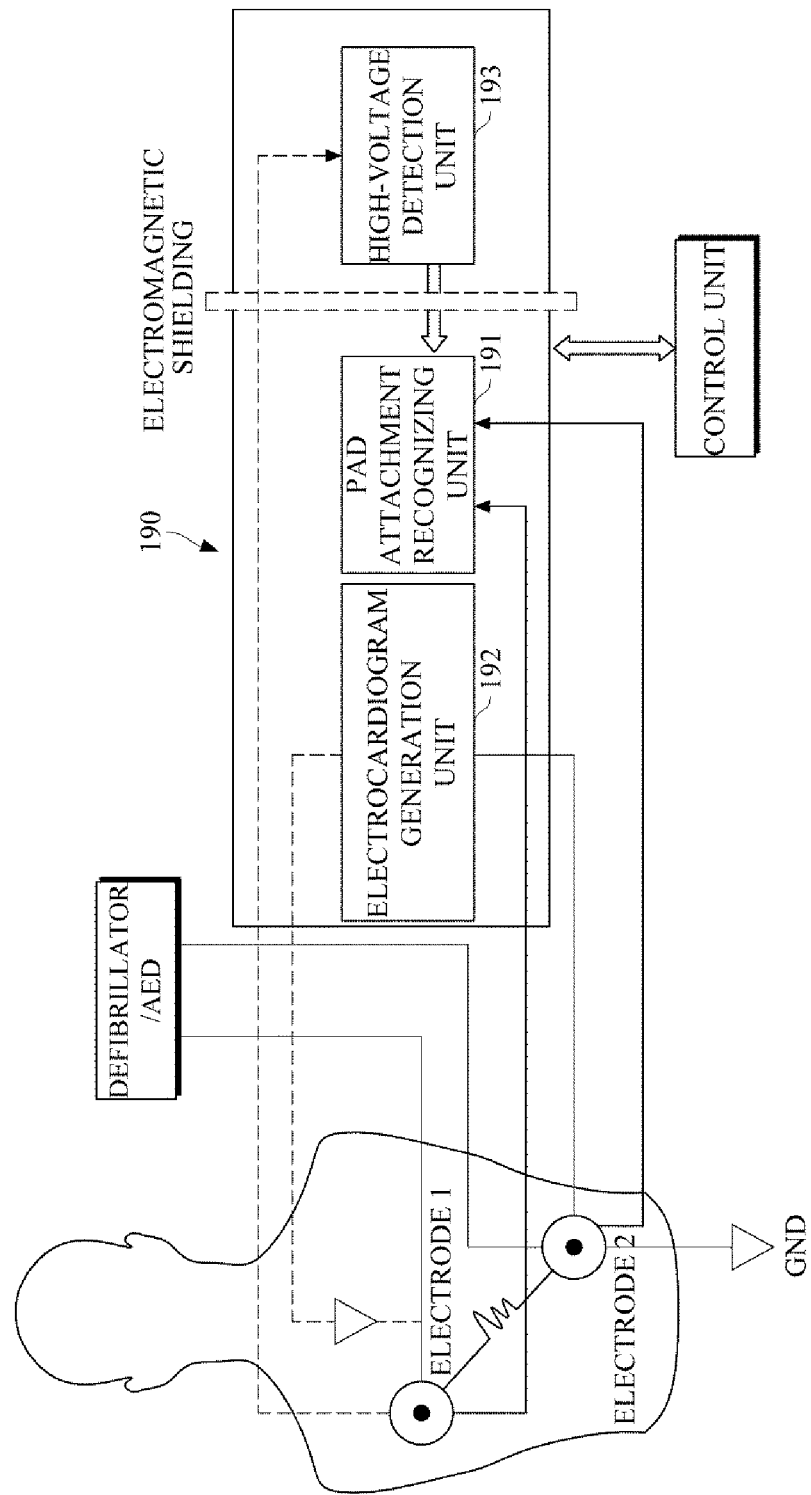
FIG. 10 is a view schematically illustrating a defibrillator training module in the simulator according to the exemplary embodiment of the present invention.

Meanwhile, referring to FIG. 10, the simulator 100 according to the exemplary embodiment of the present invention may include the defibrillator training module 190. The defibrillator training module 190 is configured by integrating an electrocardiogram signal generation module and a defibrillator electric impact response module.

The electrocardiogram signal generation module outputs, to a pad for a manual defibrillator or AED attached to the human body model 110, an electrocardiogram signal such as a normal signal, a ventricular fibrillation signal or a ventricular tachycardia signal according to the state of the patient. The output electrocardiogram signal reproduces the waveform and intensity of a signal generated in an actual human body, so that a commercialized defibrillator can recognize the output electrocardiogram signal. When the normal signal is generated, an electrical impact is not applied in the defibrillator. When the ventricular fibrillation signal or ventricular tachycardia signal is generated, the electrical impact is manually applied in the manual defibrillator, or the electrical impact is automatically applied in the AED.

The defibrillator electric impact response module protects sensors and circuits in the simulator from the electrical impact generated from the defibrillator, and senses the number of electrical impacts applied.

The defibrillator training module 190 described above may include a pad attachment recognizing unit 191, an electrocardiogram generation unit 192 and a high-voltage detection unit 193.

The pad attachment recognizing unit 191 senses that electrodes included in a general defibrillator have been attached. The pad attachment recognizing unit 191 may be configured with a photovoltaic cell. The pad attachment recognizing unit 191 includes a voltage control circuit so as to control the voltage level of a signal output from the photovoltaic cell, and the output signal may be processed through an A/D converter of the microprocessor. Here, a pressure reducing resistor (metal clad resistor) having similar impedance to an actual human body may be disposed between portions at which the electrodes are attached in the pad attachment recognizing unit 191. The pressure reducing resistor may be used to absorb impact energy output from the defibrillator. Digital values including various types of cardiac rhythm information such as a normal waveform, a ventricular fibrillation waveform and a ventricular tachycardia waveform may be stored in a memory of the microprocessor. An input/output interface of the microprocessor may have a built-in communication chip for communicating with the main control module 120. The input/output interface of the microprocessor executes a command transmitted from the main control module 120, and outputs information on the presence of attachment of pads and the number of electrical pulses applied in the defibrillator.

If two electrodes included in the defibrillator are attached to the breast of the torso part 111 of the human body model 110, the intensity of light incident to the photovoltaic cell positioned below the two electrodes changes, and accordingly, the pad attachment recognizing unit 191 recognizes that the electrodes of the defibrillator have been attached to the torso part 111 of the human body model 110.

The electrocardiogram generation unit 192 outputs various rhythms of an actual human body to the outside. When the pad attachment recognizing unit 191 recognizes that the electrodes of the defibrillator have been attached, the electrocardiogram generation unit 192 implements various rhythms generated from an actual human body. When the pad attachment recognizing unit 191 does not recognize that the electrodes of the defibrillator have been attached, the electrocardiogram generation unit 192 is not operated. To this end, the electrocardiogram generation unit 192 may be configured to control digital values output using an 8-bit D/A converter and a micro controller unit (MCU). The detailed operation of the electrocardiogram generation unit 192 will be described. TTL signals respectively output from 8 output ports of the microprocessor are converted into a hexadecimal block, and the converted hexadecimal block is transferred to an input terminal of the D/A converter. The input digital signal is converted into an analog signal in proportion to a reference voltage (e.g., the reference voltage can be described as being 1), and the converted analog signal is output through an amplifier (Amp). The generated analog signal may have the same amplitude as the cardiac rhythm generated from an actual human body by passing through a resistor (signal attenuation resistor).

The high-voltage detection unit 193 protects the modules in the human body model 110 by reducing impact pulse energy (about 0 to 300 J) generated in the manual defibrillator or AED, and measures the number of impact pulses generated from the defibrillator by sensing the impact pulses generated from the defibrillator. In the high-voltage detection unit 193, a voltage reducing resistor and a pressure reducing circuit may be used to measure a high-voltage signal of 1000 V or more, output from the defibrillator, and the external interrupt function of the microprocessor may be used to measure an impulse signal output from the voltage reducing circuit.

The pad attachment recognizing unit 191, the electrocardiogram generation unit 192 and the high-voltage detection unit 193 may be controlled by a separate control device. For example, the control device may be a microprocessor. The microprocessor may control the operation of the defibrillator training module 190 through communication with the pad attachment recognizing unit 191, the electrocardiogram generation unit 192 and the high-voltage detection unit 193, using a serial communication protocol (RS485) scheme. The control device may be integrated with the main control module 120.

In the simulator 100 according to the exemplary embodiment of the present invention, the function of outputting an electrocardiogram signal and the function of responding to a defibrillator voltage are performed by one defibrillator training module 190, so that it is possible to simplify the structure of the simulator 100 and to stably protect chips or circuits in the human body model 110 from a high voltage generated from the defibrillator when the user performs defibrillator training.

As apparent from the above description, through the simulator for CPR and defibrillator training, CPR and the use of the defibrillator for emergency medical technicians such as a doctor, a nurse and an emergency medical technician can be systematically and repetitively trained, and a person in charge of training can identify whether or not the education is performed effectively by recording and evaluating a training situation. Also, through the simulator, the education of CPR and defibrillator training is possible so that not only the emergency medical technicians but also general people can perform emergency treatment effectively.

Further, since the simulator for CPR and defibrillator training can approximate use of an actual human body, the user can undergo training of consciousness identification, airway security, pulse identification, breast pressure, artificial respiration and use of a manual defibrillator or AED, which constitute the CPR procedure, without dealing with an actual human body. Thus, the degree of proficiency according to the repetitive training can be increased, and a trainer undergoing the training through the simulator can feel familiar with an actual human body.

In the related art simulator, the pupil reflection, the pulse generation and the voluntary breathing are manually implemented. However, in the simulator for CPR and defibrillator training, when the CPR and the use of the defibrillator are properly performed according to the built-in scenario program, the pupil reflection, the pulse generation, the voluntary breathing and the generation of the normal electrocardiogram signal are automatically implemented, so that the reality of training can be improved.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A simulator for cardiopulmonary resuscitation (CPR) and defibrillator training, the simulator comprising:
   a plurality of elastic units each of which has a human rib-shaped structure;
   a top plate coupled to centers of each of the elastic units;
   a bottom plate coupled to both ends of each of the elastic units;
   a reflection part coupled to a surface of the top plate in a direction facing the bottom plate; and
   a plurality of distance measuring units disposed on a surface of the bottom plate in a direction facing the reflection part, and configured to measure distances between each of the distance measuring units and the reflection part and determine a position of the simulator based on the distances.

* * * * *